Aug. 20, 1957  W. F. AUSTIN  2,803,409
WATER MIXING VALVE FOR USE IN WATER
HEATERS OR STORAGE TANK SYSTEMS
Filed April 11, 1956  2 Sheets-Sheet 1
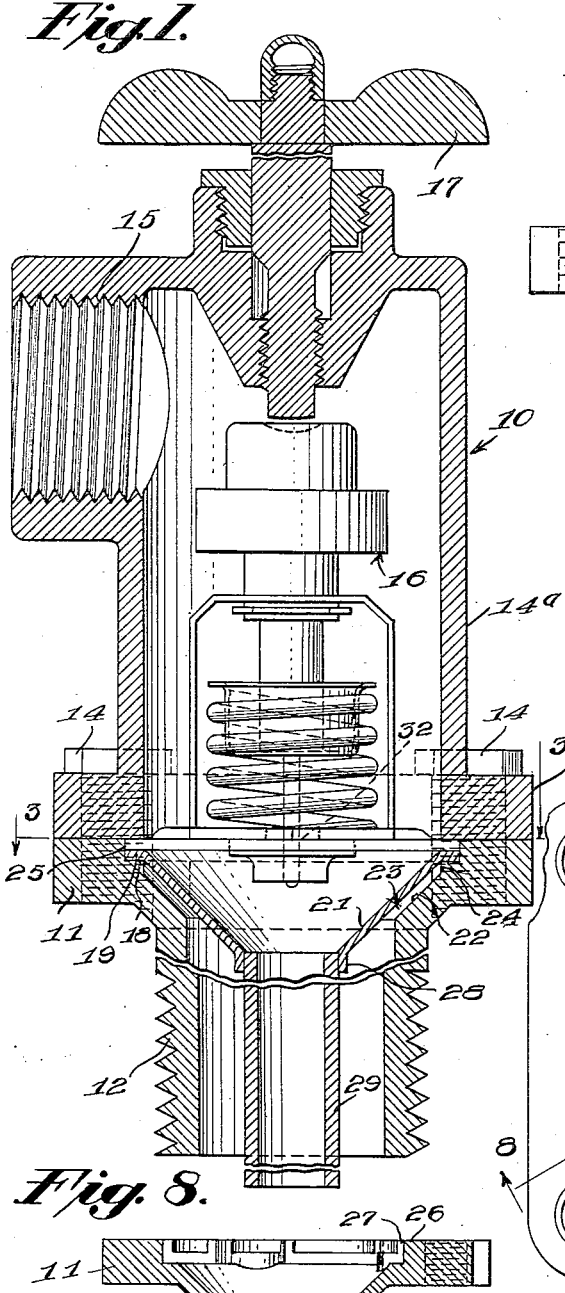
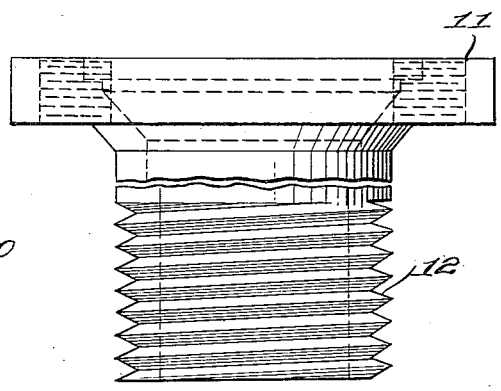
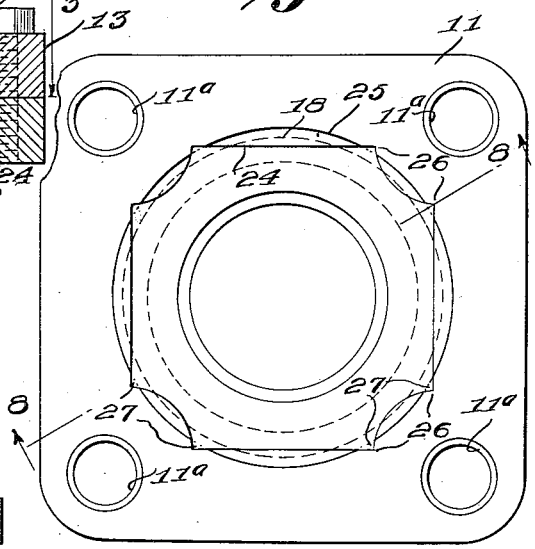
INVENTOR
Wendell F. Austin.
BY
ATTORNEY Aug. 20, 1957 W. F. AUSTIN 2,803,409
WATER MIXING VALVE FOR USE IN WATER
HEATERS OR STORAGE TANK SYSTEMS
Filed April 11, 1956 2 Sheets-Sheet 2
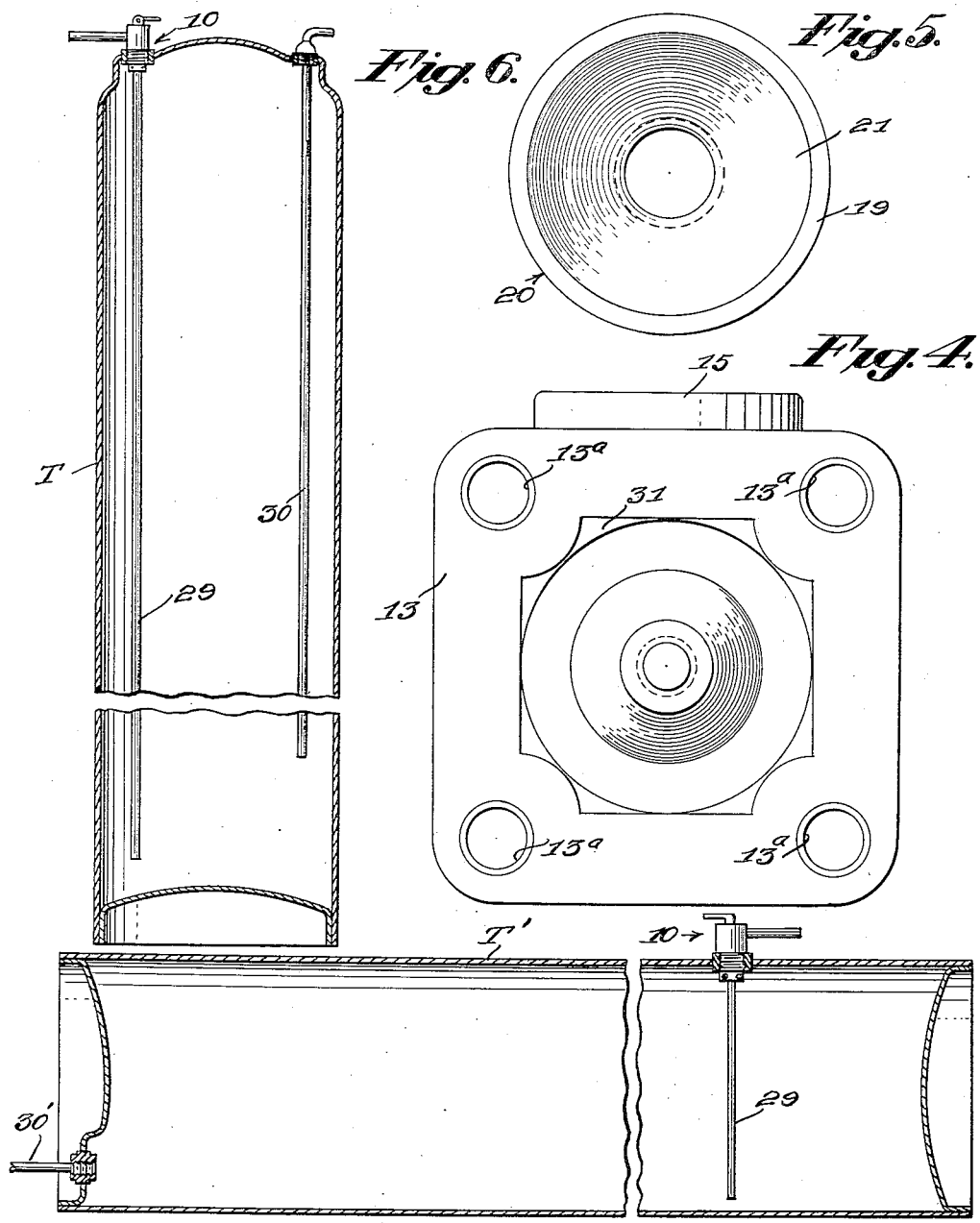
INVENTOR
Wendell F. Austin
BY
ATTORNEY

United States Patent Office 2,803,409
Patented Aug. 20, 1957

2,803,409

WATER MIXING VALVE FOR USE IN WATER HEATERS OR STORAGE TANK SYSTEMS

Wendell F. Austin, Medford, Mass., assignor to Metromatic Manufacturing Co., Inc., Medford, Mass.

Application April 11, 1956, Serial No. 577,579

5 Claims. (Cl. 236—12)

This invention relates to a water mixing valve for use in water heaters or storage tank systems.

As is generally known, water in a water heating tank will stratify in thermal layers which are of successively greater temperature from the bottom to the top of the tank, with the result that the water adjacent the top and which is first to be drawn is usually too hot for comfortable use and after drawing off such hot water, the water becomes colder and soon is too cold for comfortable use.

It is accordingly a primary object of this invention to provide a mixing valve through which drawn water passes and which functions to mix the hot and cold water in the tank whereby a substantial volume of water at a comfortable temperature may be drawn.

Heat applied to the bottom or other part of a container or tank immediately affects the temperature of the incoming cold water and since this is the point of greatest temperature difference, it follows that the fastest change in temperature will occur here.

This change, however, is not sufficiently fast to offer a fast draw of heated water.

It is accordingly a further object of the invention to provide a mixture valve which is directly insertable into the tank and by which such fastest change in temperature is utilized to give a definite increase in volume at a set temperature of the water being drawn from the valve.

A still further object of the invention is a heater mixing valve which is insertable as a unit into the tank in the absence of multiple connections now employed with mixing valves which are installed externally of the tank whereby the installation is greatly simplified.

Other objects and advantages of the invention will become apparent in the course of the following detailed description, taken in connection with the accompanying drawings, wherein—

Fig. 1 is a broken axial vertical sectional view of the improved valve in accordance with a preferred structural embodiment thereof.

Fig. 2 is a broken side elevational view of the insertion flange and inlet of the valve.

Fig. 3 is a top plan view of the insertion flange as observed in the plane of line 3—3 on Fig. 1.

Fig. 4 is a bottom plan view of the flange having a mixing chamber and also showing the outlet, the view being substantially in the plane of line 3—3 of Fig. 1 as observed in a direction opposite to the arrows thereon.

Fig. 5 is a top plan view of a partition separating the cold and hot water entering the mixing chamber.

Fig. 6 is an axial vertical sectional view of a vertical tank showing an operative association of the improved valve therewith.

Fig. 7 is an axial vertical sectional view of a horizontal tank showing an operative association of the valve therewith.

Fig. 8 is a vertical sectional view as observed in the plane of line 8—8 on Fig. 3.

Referring now in detail to the drawings, the improved mixing valve is designated in its entirety as 10 which embodies a flange 11 having an externally threaded cylindrical extension 12 which is adapted to be threaded into the upper end wall of a vertical tank T or into the side wall of a horizontal tank T'.

Disposed upon and removably secured to flange 11 is a similar flange 13, the flanges being provided with axially aligned tapped openings 11ª and 13ª respectively through which extend securing bolts 14.

The flange 13 is integral with the main body portion 14ª of the valve and which per se embodies the structures of existing valves as the mixed water outlet 15, the thermal power element 16 and the adjusting handle 17. The flange 11 is provided with an internal circumferential shoulder 18 on which is supported the horizontal rim 19 of a water separating partition 20 which further includes a downwardly converging frusto-conical portion 21 disposed in spaced relation to a parallel frusto-conical wall 22 on the flange 11 thereby providing a space 23 for a purpose later to appear.

The said wall 22 merges into a short vertical wall 24 of the contour indicated in Fig. 3.

A vertical wall 25 is disposed outwardly of the shoulder 18 and from Fig. 3 it will be seen that wall 24 extends beyond wall 25 at the points indicated at 26 whereby a plurality of relatively small hot water ports 27 are provided.

The frusto-conical portion 21 of the partition terminates within the extension 12 in a vertical tubular flange 28 within which is supported the upper end of a tube 29 whose lower end is disposed adjacent the bottom wall of tank T or the lower side wall of tank T'.

At this point, it is to be observed that a cold water supply tube 30 also extends vertically within the tank T whereas the horizontal tank T' is provided in an end thereof with a cold water supply tube 30'.

With reference to Fig. 4 it will be observed that flange 13 is provided with hot water ports 31 and that an adjustable cold water intake 32 is provided within the flanges 11 and 13.

In use of the improved valve, cold water is drawn from the bottom of the tank upwardly through tube 29, within partition 20 and through the intake 32. Now water from adjacent the top of the tank enters the extension 12 and passes externally of the partition 20 and through ports 27 and 31 and mixes with the cold water within the mixing chamber.

Since the cold water conducting tube 29 extends substantially from the bottom to the top wall of the tank, the cold water entering the lower end of the tube will be subject to the heat of the water in the tank and will accordingly be substantially tempered upon reaching the intake 32.

By taking water from the bottom of the tank, the volume of water drawn is substantially increased, because the low water temperature in a tank provided with the improved valve is about 25 degrees higher than the temperature of the incoming water. For example, water in a tank at 160 degrees being mixed with water at 50 degrees to obtain an ultimate temperature of 135 degrees will not require very much water at 50 degrees.

With the present internal mix principle, water at the bottom of the tank is pre-heated. When water is drawn off, the incoming water is still at 50 degrees and the tank water temperature at 160 degrees.

At the point of water mix the water is as much as 25 degrees higher than in present mixing systems due to the tempering of the cold water in its upward passage through the tube 29 which receives only a small part of temperature increment within the tube.

While the total water temperature of the tank is not changed, but as in all hot water tanks the complete content of heat cannot be drawn out because of the cold water mixing at the lower two or three inches of the tank. In accordance with the present invention, however, the cold water tube 29 is in the general area of the bottom of the tank, and because of which a percentage of water is drawn from the bottom of the tank, mixed with the top temperature water, and accordingly, a greater volume of usable hot water is actually drawn from the tank.

Water at 160 degrees mixed with water at 75 degrees in obtaining an ultimate temperature of 135 degrees results in greater volume of available water because of the higher starting temperature of the cold water available for mixing.

The average heater or cylinder currently in use is approximately 54 inches or more in height. The theory of stratification is 10 degrees per foot. Therefore, there is a variable of 45 degrees from top to bottom of the tank. The principle of the present valve is a utilization of this natural condition. The stratification of water temperature is the basic concept of the present valve. Employing the theory of mixing the two different temperature waters by stratification results in a lower cost of operation because of the ability to mix the high and low temperature waters to a predetermined setting.

Furthermore, the present valve does not require connections from hot to cold to mix, resulting in a lower installation cost and a more efficient operation by use of a greater volume of water.

Having set forth the present invention in accordance with a preferred structural embodiment thereof, what is claimed and desired to be secured by U. S. Letters Patent is:

1. A water mixing valve for use in hot water tanks, comprising a body including an externally threaded cylindrical member adapted to be threaded into the top wall of a tank, a valve body removably secured to and above said first body, said valve body being provided with a cold water inlet, a mixed water outlet and an adjustable thermal power element for regulating the flow of cold water through said inlet, said first body having an inner wall, a partition member disposed in spaced relation to said wall and a tube depending from said partition member, said tube adapted to conduct cold water through said inlet into a mixing chamber within said valve body, and ports in said bodies for conducting hot water into said mixing chamber which hot water is directed through the lower end of said first member externally of said partition member.

2. The structure according to claim 1 wherein said tube is in spaced concentric relation to said first member for passage of hot water between same and into the space between said wall and said partition for flow through said ports.

3. The structure according to claim 1 wherein said ports are circumferentially spaced and extend through said bodies.

4. The structure according to claim 1, wherein said partition is of inverted frusto-conical form having an upper horizontal flange and a lower vertical flange, said tube extending into said last flange and secured thereto.

5. Means for mixing hot and cold water in a tank, comprising a mixing valve including an externally threaded extension adapted to be threaded into an opening in the upper wall of the tank, a mixing chamber in said valve, a partition member, disposed below said chamber, a tube adapted to extend from adjacent the bottom wall of the tank and within said partition for delivery of cold water into said mixing chamber, and said tube extending through said extension and being of substantially less diameter for passage of hot water through said extension and externally of said partition into said mixing chamber.

References Cited in the file of this patent
UNITED STATES PATENTS
1,891,926    Hall _____ Dec. 27, 1932
FOREIGN PATENTS
167,238    Great Britain _____ July 28, 1921